S. W. NOGGLE.
DOUGH MIXING AND KNEADING MACHINE.
APPLICATION FILED JULY 5, 1910.
1,153,246.
Patented Sept. 14, 1915.
3 SHEETS—SHEET 1.
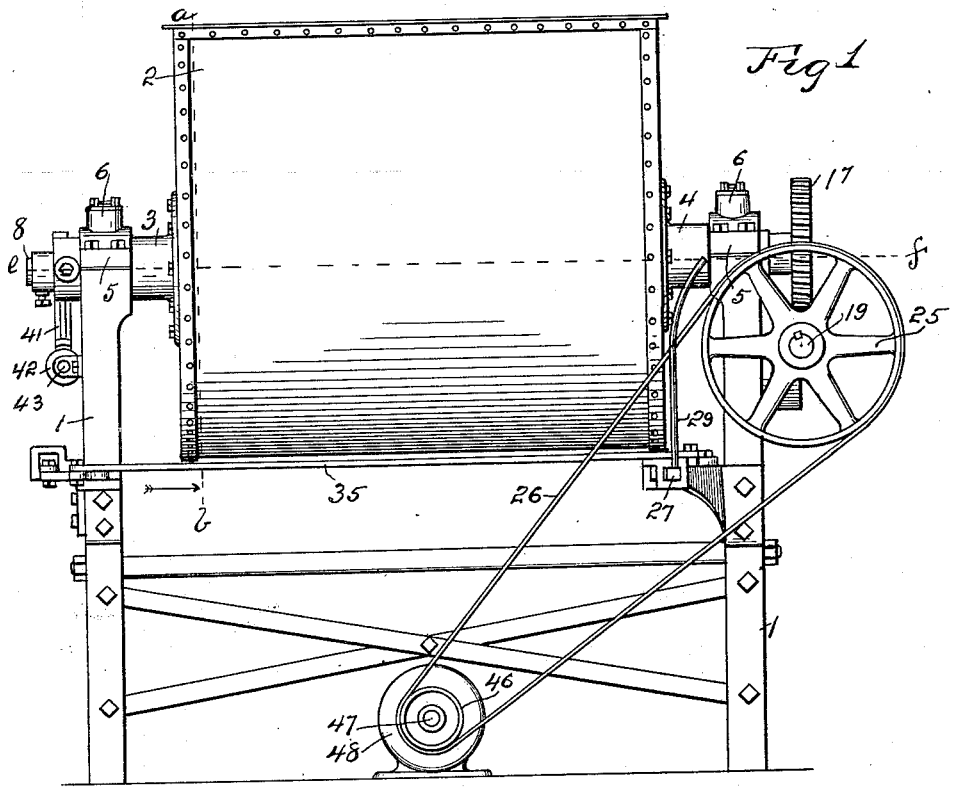
Fig 1
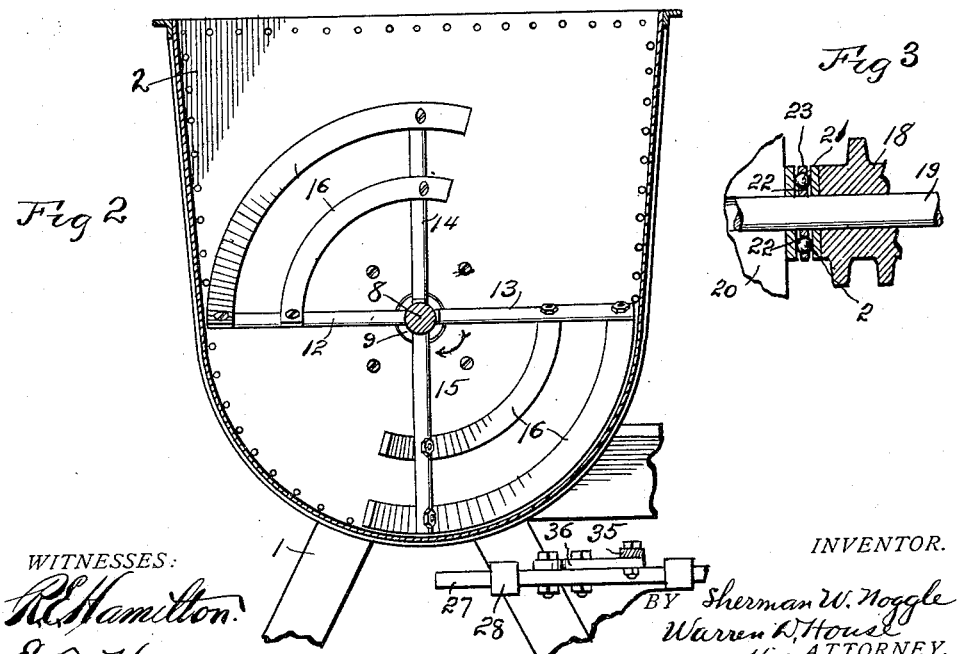
Fig 2
Fig 3
WITNESSES:
R. E. Hamilton
E. B. House
INVENTOR.
Sherman W. Noggle
BY Warren D. House
His ATTORNEY.

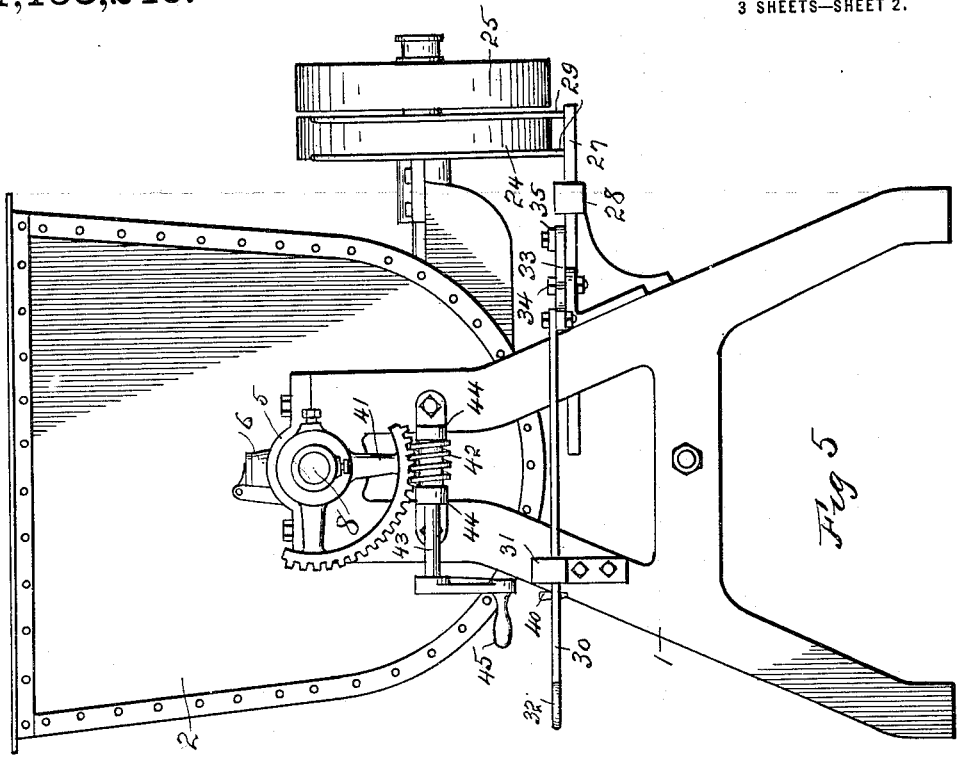

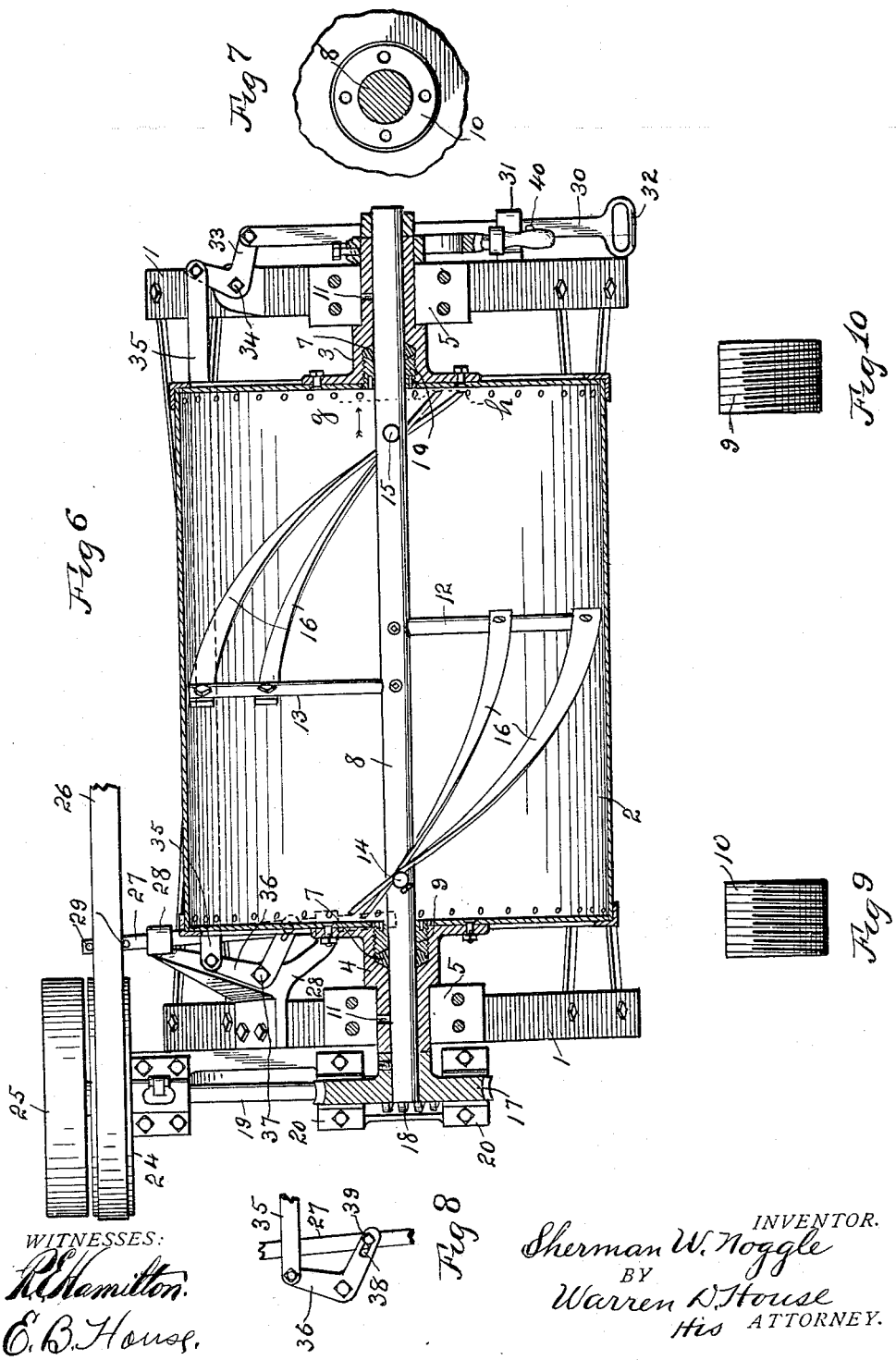

UNITED STATES PATENT OFFICE.

SHERMAN W. NOGGLE, OF KANSAS CITY, MISSOURI.

DOUGH MIXING AND KNEADING MACHINE.

1,153,246.  Specification of Letters Patent.  Patented Sept. 14, 1915.

Application filed July 5, 1910. Serial No. 570,367.

*To all whom it may concern:*

Be it known that I, SHERMAN W. NOGGLE, a citizen of the United States, residing at Kansas City, in the county of Jackson and State of Missouri, have invented certain new and useful Improvements in Dough Mixing and Kneading Machines, of which the following is a specification.

My invention relates to improvements in dough mixing and kneading machines.

My invention is of a type in which the mixing vessel is tiltably mounted on a frame and in which a rotary shaft extends through the mixing vessel and carries one or more revoluble mixing and kneading devices.

One object of my invention is to provide novel means for packing the rotary shaft where it extends through the walls of the mixing vessel so as to prevent the admission into the vessel of oil employed in lubricating the bearings of the shaft and also to prevent water from the dough passing from the vessel along the shaft into the shaft bearings.

A further object of my invention is to provide novel means for tilting the dough mixing vessel, the tilting means providing also means by which the vessel is releasably held in the position to which it is moved.

Another object of my invention is to provide a powerful and yet simple and noiseless driving mechanism for rotating the shaft which carries the kneading mechanism.

Still another object of my invention is to provide novel mechanism by which the operator of the machine may remain at one place and readily control the tilting and driving mechanism.

Other features of my invention are hereinafter more fully described and claimed.

In the accompanying drawings which illustrate the preferred form of my invention—Figure 1 is a rear elevation of the machine. Fig. 2 is a vertical sectional view on the dotted line *a—b* of Fig. 1. Fig. 3 is an enlarged, horizontal sectional view on the dotted line *c—d* of Fig. 4. Fig. 4 is an elevation of one end of the machine. Fig. 5 is an elevation of the other end of the machine. Fig. 6 is a horizontal sectional view, taken on the dotted line *e—f* of Fig. 1. Fig. 7 is an enlarged vertical sectional view, taken on the dotted line *g—h* of Fig. 6. Fig. 8 is a fragmentary top view of a portion of the belt shifting mechanism. Figs. 9 and 10 are side elevations of the two clamping rings which serve to clamp the packing material against the shaft.

Similar characters of reference denote similar parts.

1 denotes the frame of the machine, which may be of any desired form, 2 denotes the mixing vessel for containing dough, said vessel having a semi-circular bottom and an open top, best shown in Fig. 2. Opposite ends of the vessel 2 are provided with horizontal outwardly extending trunnions 3 and 4, which are rotatively mounted in bearings 5, which are provided on the frame 1. On the bearings 5 are provided suitable oil cups 6. The inner ends of the trunnions 3 and 4 are provided with central axial recesses, adapted to receive therein packing material 7, which is adapted to be clamped against a horizontal rotary shaft 8, which extends axially through the trunnions 3 and 4. For clamping the packing material 7 against the shaft 8, I provide preferably two clamping rings 9 and 10, which encircle the shaft 8 and are mounted in the recesses in the trunnions 4 and 3 respectively. Said recesses are preferably provided with right and left hand screw threaded inner surfaces, in which are fitted correspondingly threaded clamping rings 9 and 10.

11 denotes oil holes extending radially through the trunnions 3 and 4. When the packing rings 9 and 10 are fitted in their respective positions the packing material 7 is tightly clamped upon the shaft 8 and against the trunnions 4 and 3, thus preventing oil from the bearings 5 from entering the dough mixing vessel 2 along the shaft 8. This mechanism also prevents water from the dough contained in the vessel 2 from passing from said vessel along the shaft 8.

For mixing and kneading the dough the following described mechanism is preferred:—12 and 13 denote radially extending bars, the inner ends of which are mounted in holes in the shaft 8, said holes being disposed at opposite sides of a plane transversely bi-secting the vessel 2. The bars 12 and 13 extend in diametrically opposite directions. 14 and 15 denote respectively two radial bars which have their inner ends secured to the shaft 8, adjacent respectively to the ends of the vessel 2. The bars 14 and 15 are disposed at right angles to the bars 12 and 13 and extend in opposite directions from the shaft 8. 16 denotes spirally formed plates, four in number, of which one pair is secured to the bar 13 and to the bar 15, the other pair being secured to the bars 12 and 14. The bars 16 are preferably relatively thin, flat bars, the lead of the plates which are secured to the bar 13, being in a direction opposite that of the lead of the plates which are secured to the bar 12. When the shaft 8 is rotated in the direction denoted by the arrow in Fig. 2, the plates secured to the bar 13 will force the dough to the left, as viewed in Fig. 6, while the plates which are secured to the bar 12 will force the dough toward the right, as viewed in Fig. 6. The outer plates 16 of each pair rotate close to the semi-circular bottom portion of the mixing vessel, as shown in Fig. 2. As the plates 16 of both pairs extend at their inner ends across the middle portion of the vessel 2, the dough will be worked to the right and left between the ends of the vessel 2 in much the same manner as it is worked ordinarily by hand. As the plates 16 are thin they will cut the dough, as well as mixing and kneading it.

For rotating the shaft 8, I preferably secure thereto a worm wheel 17, which meshes with a worm 18, which is rigidly secured to a horizontal driving shaft 19, rotatably mounted in suitable bearings 20, provided on the frame 1. To receive the end thrust of the worm 18, due to the resistance offered by the dough, to the plates 16, I provide intermediate the worm and the left bearing 20, as viewed in Fig. 4, a roller bearing, best shown in Fig. 3, and consisting preferably of a series of balls 21, mounted in transverse holes 22, provided in a ring 23, which encircles the shaft 19, intermediate of the worm 18 and the bearing 20, just referred to. The balls 21 bear against the end of the worm 18 and against the adjacent bearing 20. A tight pulley 24, and a loose pulley 25, are mounted on the shaft 19. 26 denotes a belt for engaging the pulleys 24 and 25 alternately. A horizontal belt shifting bar 27 is slidably mounted in a bracket 28, secured to the frame 1, adjacent to the shaft 19. The bar 27 has secured to it two vertical rods 29, which are disposed at opposite edges of the belt 26.

To operate the belt shifter just described, from the forward side of the machine, the forward side being the right side, as viewed in Fig. 4, the following mechanism is preferably provided:—An operating member comprising a horizontal forwardly and rearwardly extending bar 30, is slidably mounted in a bracket 31, secured to the right end of the frame 1. The forward end of the bar 30 is provided with a handle 32 and the rear end is pivoted to a horizontal, bell crank lever 33, which is pivoted by a vertical bolt 34 to the frame 1 and has pivoted to its other arm a horizontal, longitudinal bar 35, which is connected to one arm of a bell crank lever 36, which is pivoted by a vertical bolt 37 to a bracket 28 in which the belt shifting bar 27 is mounted. The other arm of the lever 36, as shown in Fig. 8, is provided with a longitudinal slot 38, through which extends a vertical bolt 39, the lower end of which is secured to the bar 27. By pulling the operating bar 30 forwardly to the position shown in Fig. 6, the belt 26 will be shifted onto the pulley 24, so as to cause rotation of the shafts 8 and 19. To stop the machine, the operating bar 30 is forced rearwardly, thereby shifting the belt 26 onto the pulley 25, through the intermediacy of the shifting mechanism hereinbefore described. To lock the operating bar 30 in the forward or rearward position, said bar is provided with a vertical hole, which, when the bar is in the forward position, is at the front of the bracket 31, said hole being to the rear of the bracket when the bar 30 is in the rear position. A removable pin 40 is fitted in the said hole, as shown in Fig. 5. By removing the pin 40 the bar 30 may be moved forward or backward as desired, and then held in the position to which it is adjusted by re-inserting the pin 40.

For tilting the vessel 2 so that access may be readily had to its interior from the front, I preferably provide a toothed member comprising a segmental worm wheel 41 which is rigidly secured to the trunnion 3 concentrically therewith, and which engages a worm 42 secured to and rotatable with a horizontal crank shaft 43 rotatably mounted in bearings 44 secured to the frame 1 adjacent to the bracket 31. The crank shaft 43 is provided with a crank arm 45 disposed at the forward side of the machine adjacent to the handle 32, so that the operator may stand in one position at the front of the machine and control the running of the machine and the tilting thereof.

To tilt the machine, it is but necessary to turn the crank arm 45 in the proper direction, thereby swinging the vessel 2 through the intermediacy of the shaft 43, worm 42, segmental wheel 41 and trunnion 3.

The belt 26 may be driven by any suitable means as by a pulley 46 secured on the armature shaft 47 of a motor 48.

I do not limit my invention to the specific structure shown and described, as many modifications, within the scope of the appended claim, may be made without departing from the spirit of my invention.

Having thus described my invention, what I claim and desire to secure by Letters Patent, is:—

In a dough mixing machine, a frame, a dough mixing vessel supported thereby, a shaft extending through and rotative in said vessel, two pairs of radial bars secured to said shaft, the bars of each pair being at right angles to each other and respectively disposed adjacent to one end and to the middle of said vessel, the inner bar of each pair being intermediate the bars of the other pair, corresponding bars of the two pairs extending oppositely from said shaft, and two sets of spiral blades secured respectively to said two pairs of bars.

In testimony whereof I have signed my name to this specification in presence of two subscribing witnesses.

SHERMAN W. NOGGLE.

Witnesses:
P. P. LADD,
G. W. SOLLARS.

Copies of this patent may be obtained for five cents each, by addressing the "Commissioner of Patents, Washington, D. C."